United States Patent [19]

Mayer

[11] 4,014,110
[45] Mar. 29, 1977

[54] CRYSTAL STRUCTURE MODEL

[76] Inventor: Ludwig A. Mayer, 4492 Thistle Drive, San Jose, Calif. 95136

[22] Filed: Sept. 21, 1976

[21] Appl. No.: 725,196

Related U.S. Application Data

[63] Continuation of Ser. No. 553,478, Feb. 27, 1975, abandoned.

[52] U.S. Cl. .................... 35/18 A; 46/17
[51] Int. Cl.² ......................... G09B 23/26
[58] Field of Search ........... 35/18 R, 18 A, 27, 34; 46/16, 17

[56] References Cited

UNITED STATES PATENTS

| | | | |
|---|---|---|---|
| 2,984,488 | 5/1961 | Kirchner | 35/27 X |
| 3,568,357 | 3/1971 | Lebensfeld | 35/27 UX |

OTHER PUBLICATIONS

Bowman, H. L. Mineralogical Mag. 16, 51 (1911) Note on the Construction of Models to Illustrate Theories of Crystal Structure.
Whitlock, H. P. Am. J. Sci. 199, 259 (1920) Model for Demonstrating Crystal Structure.
Spangenberg, K. Centr. Mineral. Geol., p. 229 (1921) A Simple Device for Making Crystal Structure Models.
Lippard, S. J. W. H. Freeman and Company 1971, Laboratory Studies in General Chemistry Experiment No. 1122 : Crystal and Molecular Structure.
Bretherton, L., Kennard, C. H. L. J. Appl. Cryst. 2, 88 (1969) Practical Experiments in Crystallography; Construction of a Three-Dimensional Model.
Carter, F. L. J. Appl. Cryst. 4, 86 (1971) Constructing Crystal Models.
Bragg, Sir Lawrence G. Bell and Sons, Ltd. 1949, The Crystalline State, v. 1, A General Survey plate VIII (opposite p. 144).
Wells, A. F. Oxford University Press, 1962, Structural Inorganic Chemistry, 3rd. Ed., Fig. 33a)–d), between pp. 112 and 113.
Brenner, F. C. J. Chem. Ed., 25, 371 (1948) A New Crystal Model Construction Set.
Leybold Apparatus, Catalogs PH 37 and Supplement to PH 32 J. Klinger, Scientific Apparatus.
Catalin Limited Ionic Models, Catalin Limited, Visual Aids for Science Catalog.
Whitney, J. E. S. Tech. Educ., 2, 20 (1960) The Teaching of Structural Chemistry and Physics.
Onysczchuk, M. Can. Chem. Educ. 5, 6 (1970) Stereochemistry, 3, Models of Metallic and Ionic Crystals.

*Primary Examiner*—Harland S. Skogquist
*Attorney, Agent, or Firm*—Thomas Schneck, Jr.

[57] ABSTRACT

A model for demonstrating a variety of crystal structures wherein vertical rods represent ionic or atomic coordinate axes and spheres movably mounted on the vertical rods represent ions or atoms is disclosed. A template covering some of the holes in a base defines a selected base hole pattern for establishing atomic coordinates. Spheres are of a selected size such that certain adjacent spheres are tangent to each other.

7 Claims, 20 Drawing Figures

CRYSTAL STRUCTURE MODEL

This is a continuation of application Ser. No. 553,478, filed Feb. 27, 1975 and now abandoned.

BACKGROUND OF THE INVENTION

1. Field of the Invention

The invention relates to crystallographic models and more particularly to models of crystal structure having movable tangent spheres whose X,Y coordinates are defined by vertical rods passing through the spheres into a base.

2. Prior Art

Numerous devices incorporating spheres to represent atoms, ions or molecules have been developed and utilized to illustrate the sequence and spatial relationships of atoms, ions or molecules in a crystal structure. Such devices have been, in whole or in part, the subject of books, bibliographic monographs, surveys, patents, commercial development, as well as numerous individual articles appearing in the technical and educational literature of the physical sciences.

Perhaps the most comprehensive bibliography of materials on crystal models is contained in the publication entitled "Bibliography on Molecular and Crystal Structure Models" by Deane K. Smith, National Bureau of Standards Monograph 14, U.S. Department of Commerce, 1960.

According to the "open" and "closed" classifications of these crystal structure devices as set forth by Smith, the various types are briefly summarized as follows.

Open models are those with spheres, representing crystal structure lattice site occupants, not touching. The following are different types: (a) ball and spoke of the type having spheres, with receptor sites, joined by rod like connectors of various lengths at various angles; (b) ball and shelf of the type having spheres nested in smaller recesses of fixed plates, the plates corresponding to crystal structure planes; (c) ball and vertical rod of the type having vertical rods, with spheres at fixed or adjustable heights, mounted in a base; (d) ball and polyhedron of the type having parts of spheres adhesively secured at various positions on a hollow polyhedron made of joined transparent thin polygons.

Closed packing models are those with spheres, representing crystal structure lattice site occupants, touching. The following are different types: (a) pyramid stacking of the type having a horizontal base layer of spheres confined by various methods, with subsequent layers of spheres stacked via nesting on preceding layers; (b) container stacking of the type having spheres packed inside of a transparent hollow polyhedron; (c) ball and spoke of the type like ball and spoke open models except rod like connectors are shortened; (d) ball and shelf of the type like ball and shelf open models except horizontal plate separation is designed to effect tangency of spheres; (e) contact binding in which spheres are permanently joined at contact points by various adhesive techniques; (f) ball and vertical rod of the type like ball and vertical rod open models except spheres are tangent.

In closed models, spheres are usually held in place in such a manner as to prevent visual access to the interior portion. In open models interatomic distances and symmetry are more clearly illustrated by spheres which are also held in place.

It is an object of the present invention to provide a crystal model which has the main advantages of both open and closed models. Such a model would illustrate the close packing of tangent spheres of identical as well as different radii, characteristic of closed models, while illustrating interatomic distances, symmetry and spatial relationships, in general, of open models in a clear manner. The spatial relationships to be illustrated include the unit cell concept, simple lattice types, ion sizes, the coordination number concept, cation-anion relationships (interlocking lattices) and layer structures as well as stoichiometric relationships.

SUMMARY

The above object is achieved in a hybrid open-closed model having a base with a first number of holes in its top, planar surface. At least one template is mounted on the base exposing some of the holes in the base to vertical rods which are disposed in the exposed holes. Spheres, representing atoms or ions in a crystal lattice, are mounted in movable relationship to the vertical rods, either by allowing a sphere to pass directly through a vertical rod or by positioning a sphere in a nested position between other spheres which have vertical rods passing therethrough. The spheres to be used in demonstrating different crystal unit cells have radii related to each other such that adjoining spheres may be tangent in a close packing geometrical arrangement, with larger spheres usually representing anions and smaller spheres usually representing cations.

A number of different templates are used to cover different sets of holes in the base, thereby permitting different crystal lattice demonstrations to be made using the same base. The base includes a pair of oppositely spaced lugs which form a template alignment means for aligning a template in a proper sense such that the needed holes in the base will be exposed for forming a desired demonstration. The holes which are exposed in the base by a template are spaced at intervals corresponding to the X,Y coordinates of atoms projected onto a plane parallel to the plane of the base. If a template is used to demonstrate a unit cell of a crystal, the distances between holes correspond to projections of atoms or ions in a crystal unit cell. The template and the vertical rods used in connection with a template may be considered as an orientation means for movably stacking spheres above the base at locations corresponding to the X,Y coordinates of atoms projected onto a plane parallel to the plane of the base.

In more detail, the apparatus of the present invention includes spheres, vertical rods, a base with specially defined sets of coordinates to locate the vertical rods, small collars and at least one template.

Spheres of a single large size and of multiple smaller sizes related by ideal radius ratio to a large unit radius size sphere serve as crystal structure lattice site occupants. A smaller sphere has an ideal radius ratio in relation to the larger sphere if the smaller sphere is capable of being simultaneously tangent to a group of surrounding larger spheres, in which the larger spheres, arranged with their respective centers at the apices of a cube, octahedron or tetrahedron, are of themselves also mutually tangent along a line joining the centers of adjacent like spheres. Four sphere sizes are employed, having relative ideal radius ratios, as nearly as possible, of 1.00, 0.732, 0.414 and 0.225. The spheres of relative radii 1.00, 0.732 and 0.414 are drilled axially. The unit radius sphere generally represents atoms in the structure of an elemental substance or anions in the structure of an ionic substance, whereas the smaller spheres then represent cations in the structure of an ionic substance.

Vertical rods mounted in a base serve to reversibly receive the freely sliding drilled spheres. The vertical rods, which have no theoretical significance, do not limit the distance of closest approach of spheres along the vertical axis, hence, successively received spheres along a single rod or adjacent rods may touch.

Spheres are mounted in a movable relationship to the vertical rods either by allowing the vertical rod to pass directly through the sphere or by positioning a sphere in a nested position between other spheres which have vertical rods passing therethrough.

A base with a first number of holes in its top planar surface serves to reversibly receive the vertical rods. The holes for the vertical rods are so constituted in regards to their position in and angle with respect to the horizontal plane of the base as to confer tangency upon horizontally adjacent unit radius spheres or to confer the proper three dimensional symmetry upon a specified group of spheres assembled along the verticl axes.

Small collars, drilled to slide freely over the vertical rods, function to hold the centers of smaller spheres of a lowermost layer in the same plane as centers of horizontally adjacent larger spheres or to support unit cell occupants of a network structure that are not tangent to and supported by other occupants within the boundaries of the unit cell.

At least one template is mounted on the base exposing some of the holes in the base to the vertical rods which are disposed in the exposed holes. The template structure and function has been reviewed above.

DESCRIPTION OF THE PREFERRED EMBODIMENT

It is well known that most solid substances are crystalline in nature. One of the characteristics of crystals is that the atoms or ions within a crystal are arranged in a three-dimensional pattern which regularly repeats itself. The smallest repetitive pattern is called a unit cell. For demonstration purposes, atoms or ions in a unit cell are generally represented by spheres which are packed together to occupy the smallest volume. From this illustration, other concepts demonstrative of crystal physics will also be apparent including the coordination number concept, cation-anion relationships and stoichiometric relationships.

In a unit cell, the principal surface layers are known as faces. Thus, to demonstrate a unit cell, it is desirable to demonstrate the appearance of the faces, as well as the appearance of matter within the unit cell.

Figures 1, 2, 3A, 3B, 3C, 3D, 4A, 4B, 4C, 4D:
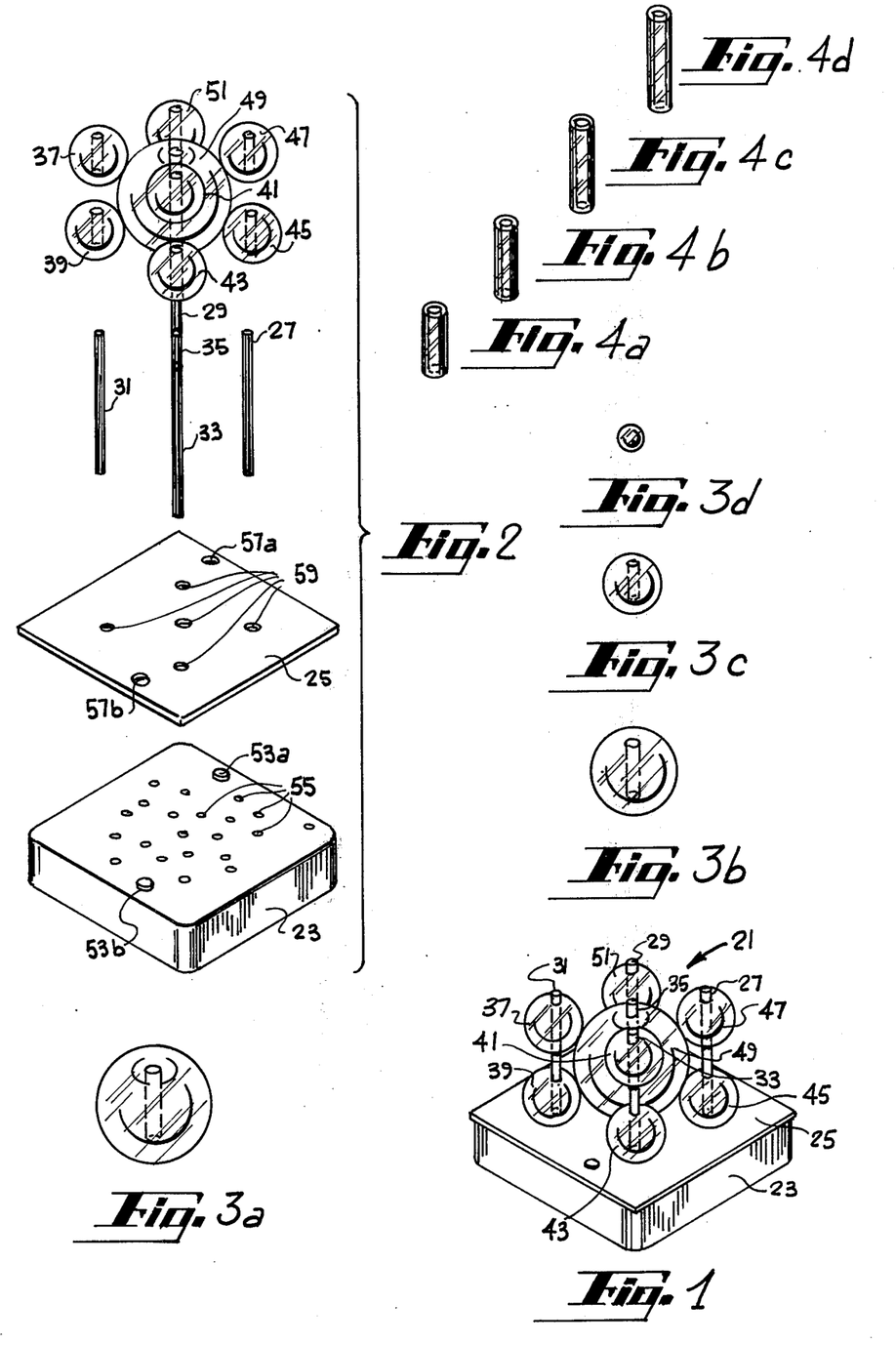
FIG. 1 is a perspective view of the apparatus of the present invention.
FIG. 2 is an exploded view of the apparatus of the present invention.
Figs. 3a, 3b, 3c, 3d are component spheres useful in the apparatus of the present invention, shown in perspective.
FIGS. 4a, 4b, 4c, 4d are component spacers, shown in perspective.

In FIG. 1, a unit cell 21 of cesium chloride is demonstrated. Such a unit cell is characterized by a central larger sphere 49, representing an anion and eight surrounding smaller spheres at the corners of a cube, representing cations. The cation-anion neighboring spheres are tangent to each other. Each sphere is tangent to at least one neighboring sphere.

In FIG. 1, each of the spheres has an axial hole drilled therethrough of a diameter slightly greater than the diameter of the vertical rods 27, 29, 31, 33, 35. Thus, the spheres are able to slide over the vertical rods and remain mounted in a movable relationship to the rods. It will be seen that each of the vertical rods is inserted in the base 23 through a template 25. The mounting of spheres is more clearly illustrated in the exploded view of FIG. 2.

In FIG. 2, the base 23 may be seen to contain a number of holes of equal depth which are drilled or otherwise formed into the base. The complete set of holes in the base is identified by the numeral 55, although tag lines extend to only some of the holes therein. The holes 55 are positioned at X,Y coordinates of all of the atoms which would be projected onto a plane parallel to the plane of the base for all atoms in unit (crystal) cells, fractions or multiples thereof to be demonstrated.

Just above the base 23 is shown a first template 25 which is mountable on the base 23. The template is mounted utilizing an alignment means which comprise studs 53a, 53b on the base and corresponding holes 57a, 57b which fit over the studs. Template 25 is designed to expose a number of holes in the base less than the total number of base holes. One means by which a desired number of holes can be exposed is by having holes 59 in template 25 of a slightly larger diameter than the holes in base 23. These holes are at the same X,Y coordinates as some of the holes in base 23 and more particularly are at the X,Y coordinates of atoms of a fraction of, multiple of or single unit cell projected onto a plane parallel to the plane of the base.

Vertical rods 27, 29, 31, 33, 35 are inserted into base 23 through holes 59 in template 25. The vertical rods serve as a portion of an orientation means detachably connected to the base for movably stacking spheres above the base at locations corresponding to the X,Y coordinates of atoms projected onto a plane parallel to the plane of the base. The other portion of the orientation means is the template 25. The vertical rods have a first, lower end disposed in one of the holes exposed by the template and an upward, distal end projecting away from the base.

All of the spheres illustrated in FIG. 2 have axial holes therethrough, i.e. holes extending along a diameter of a sphere, of a diameter slightly larger than the diameter of the vertical rods so that the spheres can pass over the vertical rods in a movable relationship to the vertical rods, with the force of gravity holding the spheres downward when the base is placed in a horizontal position. The rods usually extend in a perpendicular direction from the base, although for demonstrations of some crystal unit cells, it may be desirable to have the rods inserted at an angle with respect to the base such that the rods form oblique edges of a parallelepiped.

The radii of spheres 37, 39, 41, 43, 45, 47, 51 and 52 not visible in FIG. 2 are related to the radius of sphere 49 according to the ideal radius ratio case for coordination number eight. For example, in FIG. 2 the unit cell illustrated is that of cesium chloride. In this unit cell, there are spheres of two sizes, the smaller spheres 37, 39, 41, 43, 45, 47, 51 and 52 and the larger sphere 49. The larger sphere may demonstrate an anion, while the smaller spheres represent surrounding cations. Each cation is tangent to the anion.

In the case of the reverse arrangement, the optimum size for a smaller ion in the center of a unit cell of a simple cubic lattice may be calculated by the Pythagorean Theorem. If each larger ion at a corner of the unit cell is selected to have a radius of 1,000 units, it can be shown that to achieve an ideal radius (mutual tangency of all spheres), a central sphere would have a radius of 0.732 units. Thus, considering a cubic unit cell where the corner atoms hve a radius of 0.732, it follows that the central atom or ion will then have a radius of 1.000 units. Ideal radius ratio for coordination numbers 6 and 4 are 0.414 and 0.225 respectively. These spheres are illustrated in FIGS. 3a, 3b, 3c, and 3d respectively.

The spheres of FIGS. 3a, 3b, and 3c have axial holes therethrough for mounting on vertical rods. The sphere of FIG. 3d has no axial hole and is nested in the tetrahedral interstices between larger spheres. The various sized spheres may have different opacities such that the identification of different atoms or ions may be apparent more readily upon viewing the model. Generally it is preferable to have the larger spheres transparent, while adding some color to the smaller spheres which may also be transparent. In addition, a fluorescent doping agent may be added to some of the spheres for illumination under ultraviolet light. This would permit enhanced viewing of interior spheres when a model is alternately illuminated by white and ultraviolet light, assuming the outer spheres are transparent.

FIGS. 4a and 4b illustrate spacer members which are used adjacent to the template 25 for lifting certain spheres above the template for initiating a construction of any demonstration in which some of the spheres would tend to translate below the lowermost plane of atom centers at that coordinate. FIGS. 4c and 4d illustrate spacer members which are used to maintain the vertical coordinate of certain spheres in certain unit cells that are not tangent to and supported by other spheres within the boundaries of the unit cell.

FIGS. 5, 6, 7, 8, 9, 10, 11a and 11b illustrate various hole patterns in different templates which expose corresponding holes in the base 23. The holes are numbered to provide hole indentification both in the base and in the template. As a rule, a vertical rod is inserted in each of the holes of each of the templates shown after the template is positioned on the base with the alignment holes 57a, 57b positioned over the alignment studs 53a, 53b in the base.

The holes in template 25 and base 23 are spaced therein to aptly relate to polyhedra which characterize the cubic crystal class system, in particular the cube, octahedron and tetrahedron, with sphere centers of unit radius spheres corresponding to the apices of these polyhedra and having various smaller spheres of ideal radius ratios or spheres of unit radius positioned within the polyhedra or with a sphere of unit radius positioned in the body centers of the polyhedra and having tangent spheres of various ideal radius ratios placed at the apices. Projections of all sphere centers of these individual polyhedra onto a horizontal plane which is normal to appropriate symmetry axes of the various polyhedra result in distances between projection points on the horizontal plane that, with one exception, can be shown to be geometrically common between two or among more than two of the polyhedral projection patterns.

Figure 12:
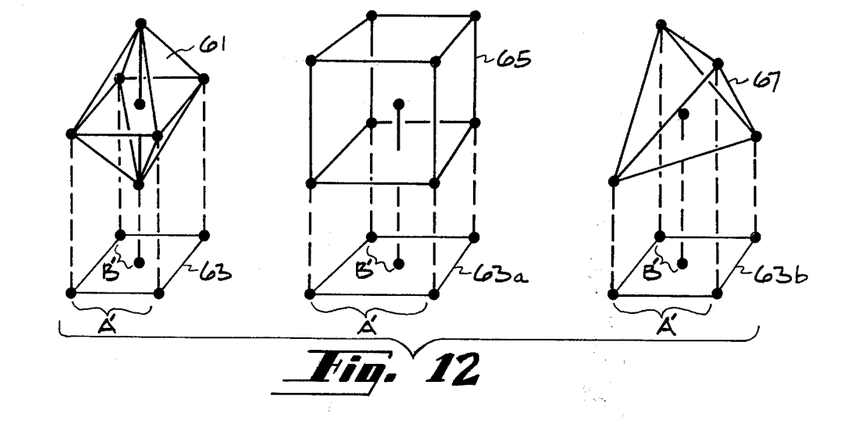
FIG. 12 shows projections of polyhedra found in the cubic crystal class onto a plane.

In FIG. 12, the octahedron 61, with a six coordinated internal lattice site, is projected downward to a horizontal plane casting the square image 63. The distance A between corners of the square 63 characterizes the projected base distance between neighboring atoms of octahedron 61. The distance B of square 63 characterizes the projected apex to central atom distance between atoms of octahedron 61.

Similarly, the cube 65, with an eight coordinated internal lattice site, is projected downward casting the square image 63a. The distance A between corners of square 63a characterizes the projected distance between neighboring atoms in the same horizontal plane of cube 65. The distance B characterizes the projected central atom to corner atom distance between atoms in the cube configuration 65.

Also, the tetrahedron 67, with a four coordinated internal lattice site, is projected downward to a horizontal plane, casting the square image 63b. The distance A between corners of the square 63b characterizes the projected distance between apices of neighboring atoms of tetrahedron 67. The distance B of square 63b characterizes the projected apex to central atom distance.

In Table I, various apical sphere and internal sphere relative sizes are given in the lefthand column of the table. In turn, the distances A' and B' of FIG. 12 have been calculated for the cube, octahedron and tetrahedron illustrated in FIG. 12. It will be noted that each square of the table, besides giving the A' and B' distaces has either the letter D' or E' or both therein. The letter D' indicates tangency of spheres along a body diagonal, whereas E' indicates tangency along an edge. D' and E' occurring simultaneously indicate the ideal radius ratio case of tangency along a body diagonal and tangency along an edge. Table I illustrates that the selected sphere sizes result in only 10 different projected distances A' and B', representing as many as 42 projected distances in the octahedron, cube and tetrahedron.

Figure 13:
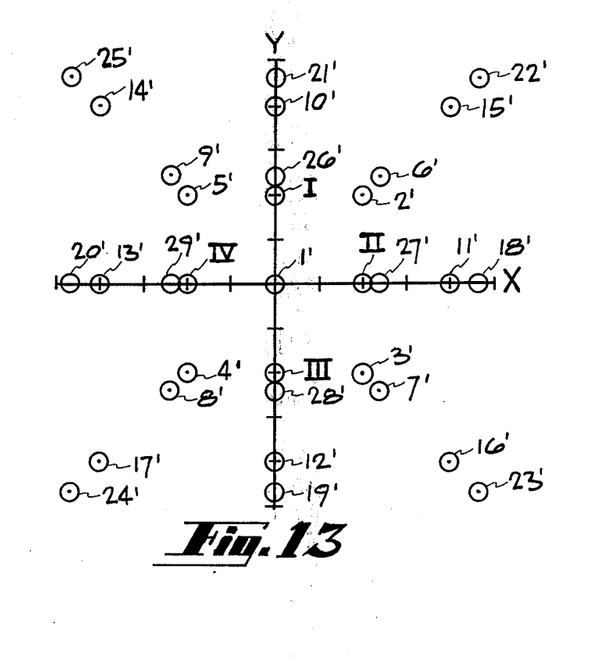
FIG. 13 is a graph of base hole locations, with coordinates identified in Table II.

The projections of FIG. 12 illustrate how crystal structures of the cubic crystal class can be regarded in terms of polyhedra. The common projected distances A' and B' illustrated in FIG. 12 and listed in Table I show that the various polyhedra may share common apices, edges and faces. Of course, the polyhedra must be oriented to have respective edges of the projected square image pattern parallel in a system where the largest sized member of all lattice site occupants is maintained at a constant sphere size and physically smaller members are size related by an ideal radius ratio as described above. The pattern of points which is generated by thd downward projection of such polyhedra is the pattern of holes for base 23. The coordinates for base 23 are illustrated in FIG. 13. It can be shown that each of seven out of the ten different distances in Table I occurs as a radial distance in FIG. 13.

Table II gives the XY coordinates of the hole locations illustrated in FIG. 13. Note that Table II consists of two sets of coordinates. Group R includes hole locations in FIG. 13 as follows: 1', 2', 3', 4', 5', 10', 11', 12', 13', 14', 15', 16' and 17'. Group S coordinates include hole locations 1', 6', 7', 8', 9', 18', 19', 20', 21', 22', 23', 24', 25', 26', 27', 28' and 29' in FIG. 13.

In general, the crystal structure utilizing Group R coordinates may exhibit sphere tangency along edges, face diagonals and body diagonals, whereas systems utilizing Group S coordinates exhibit tangency generally only on body diagonals. The letters R and S have no meaning, other than designating the two systems.

In operation, vertical rods are inserted in selected holes and spheres are passed over the vertical rods to represent various crystal structures or systems.

Figure 5:
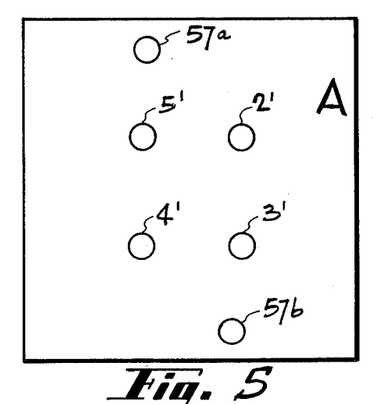
FIGS. 5, 6, 7, 8, 9, 10, 11a and 11b are top views of template components used in the apparatus of the present invention.
Figure 6:
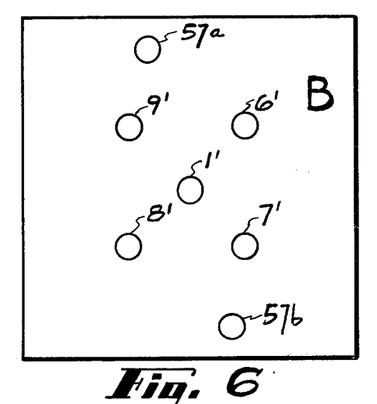
Figure 7:
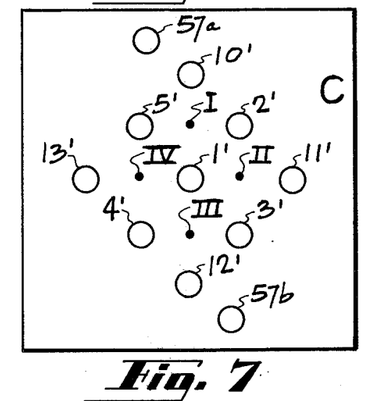
Figure 8:
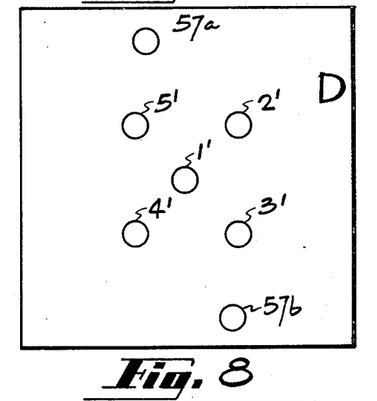
Figure 9:
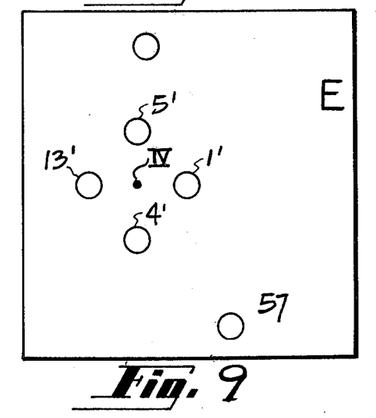
Figure 10:
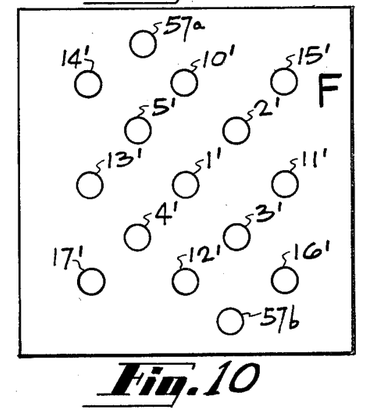
Figure 11A:
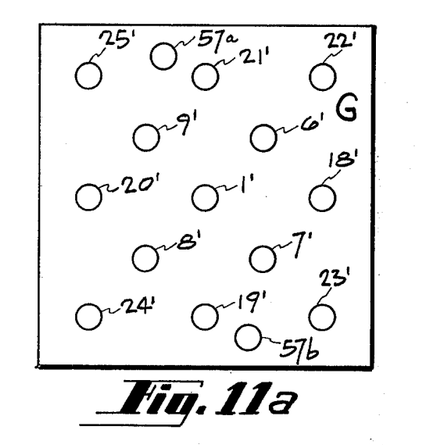
Figure 11B:
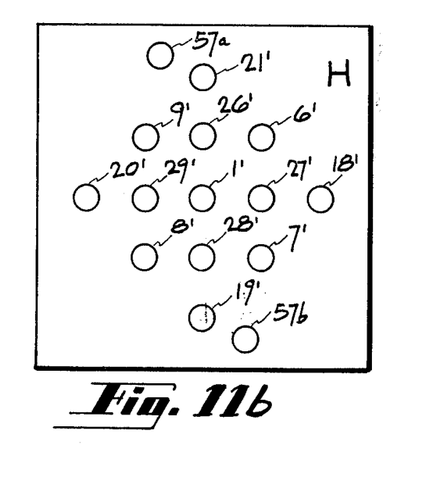

The construction of the various systems which may be represented by the apparatus of the present invention is presented in Table IIIA and IIIB which correspond to Group R and Group S coordinates respectively. In these tables each system is numbered at the left hand side. The template which exposes the proper base holes is indicated immediately to the right. Template A is illustrated in FIG. 5, B in FIG. 6, C in FIG. 7, D in FIG. 8, E in FIG. 9, F in FIG. 10, G in FIG. 11a and H in FIG. 11b. Each atomic layer is indicated in the next column to the right, followed by lower case letters indicating a size of sphere to be placed over the hole indicated by the hole number in the heading above the letters. The letter $a$ indicates a sphere of relative radius size 1.000; a sphere size $b$ indicates a relative sphere radius size of 0.732; a $c$ indicates a relative radius size of 0.414; and a $d$ indicates a relative radius size of 0.225. The letters $e, f, g,$ and $h$ indicate collars passing over vertical rods for bringing the respectively adjacent spheres into a tangency position with neighboring spheres. The length of each collar, relative to a unit radius sphere, is $e$ equals 0.586; $f$ equals 1.414; $g$ equals 2.000 and $h$ equals 2.619. It will be seen that the sphere layers are numerically designated, beginning with the No. 1 layer being closest to the base. Each layer is defined as a plane parallel to the base that bisects a set of spheres through the centers thereof. In Table IIIA roman numerals have been used to the left side of the hole numbers to indicate atomic projections where a sphere size of 0.225 is to be used and where there is no actual base hole. Vertical rods are not needed to position the small spheres and thus no base holes appear in the template for these atomic representations.

Table IV identifies the crystal system representations corresponding to each system number in Tables IIIA and IIIB. Each of the demonstrations listed in Table IV is a characteristic of more than one pure substance and as many as 145 in the case of the sodium chloride (rock salt) structure.

In FIGS. 5, 6, 8, and 9 it will be realized that each template could be constructed using a different set of base holes. For example, template A could be constructed using base holes 1, 10, 13 and 14; or 1, 10, 11 and 15; or 1, 12, 13 and 17; or 1, 11, 12 and 16. Template B could be constructed using base holes 1, 9, 20, 21 and 25; or 1, 6, 18, 21, and 22; or 1, 8, 19, 20, 24; or 1, 7, 18, 19, 23. Template D could be constructed using base holes 1, 5, 10, 13, 14; or 1, 2, 10, 11, 15; or 1, 4, 12, 13, 17; or 1, 3, 11, 12, 16. Template E could be constructed using base holes 1, 2, 5, 10; or 1, 2, 3, 11; or 1, 3, 4, 12. It will be realized also that the projection distances A' and B' of FIG. 12, as constituted into the 29 base hole locations of FIG. 13, thus serve as a prerequisite part of the orientation means by which at least the 28 demonstrations of Table IV, which yield 222 projections onto the XY plane of base 23, can be assembled.

To fully utilize the invention described herein, once a crystal system has been assembled in accord with the teachings herein, larger spheres can be partially removed from the top, edge and corner positions to facilitate examination of the sequence or spatial arrangement of underlying spheres. Unlike sizes of atoms may also be examined. Portions of the overall structure can be represented by demonstrating a selected polyhedron arrangement that employs spheres of identical as well as variable sizes. Moreover, structures of inter-locking lattices wherein cations are in closed nests can be represented by an alternative expanded structure in which the nesting spheres are represented by a larger cation size and anion spheres are suitably relocated to maintain cation-anion contact, proper unit cell symmetry and providing enhanced visualization of internal geometric relationships. Of course it will be realized that cation-anion relations are subject to an interchange of coordinate positions of larger with smaller spheres with a preservation of the tangential characteristics of assembly. The above features all characterize the open-closed hybrid model of the present invention.

In the description herein the terms horizontal and vertical have been used in a relative sense and no absolute orientation has been intended.

TABLE I

| Apical Sphere (relative size) | Internal Sphere (relative size) | Relative Distances A' and B' in Figure 12 | | | | | |
|---|---|---|---|---|---|---|---|
| | | CUBE | | OCTAHEDRON | | TETRAHEDRON | |
| | | A' | B' | A' | B' | A' | B' |
| 1 | .73205 | 2.0000, (D',E') | $\frac{2.8284}{2}$ | 2.4495, (D') | 1.7320 | 2.0000, (D') | $\frac{2.8284}{2}$ |
| 1 | .41422 | 2.0000, (E') | $\frac{2.8284}{2}$ | 2.0000, (D',E') | $\frac{2.8284}{2}$ | 1.6330, (D') | $\frac{2.3094}{2}$ |
| 1 | .22474 | 2.0000, (E') | $\frac{2.8284}{2}$ | 2.0000, (E') | $\frac{2.8284}{2}$ | $\frac{2.8284}{2}$, (D', E') | $\frac{2.0000}{2}$ |
| 1 | 1 | 2.3094, (D') | 1.6330 | 2.8284, (D') | 2.0000 | 2.3094, (D') | 1.6330 |
| .22474 | 1 | $\frac{2.8284}{2}$, (D') | $\frac{2.0000}{2}$ | 1.7320, (D') | 1.2247 | $\frac{2.8284}{2}$, (D') | $\frac{2.0000}{2}$ |
| .41422 | 1 | 1.6330, (D') | $\frac{2.3094}{2}$ | 2.0000, (D') | $\frac{2.8284}{2}$ | 1.6330, (D') | $\frac{2.3094}{2}$ |
| .73205 | 1 | 2.0000, (D') | $\frac{2.8284}{2}$ | 2.4495, (D') | 1.7320 | 2.0000, (D') | $\frac{2.8284}{2}$ |

TABLE II

| Group R Coordinates in terms of unit radius of largest sphere | | | Group S Coordinates | | |
|---|---|---|---|---|---|
| Position No. | (X , | Y) | Position No. | (X , | Y) |
| 1' | (0 , | 0) | 1' | (0 , | 0) |
| 2' | (1.0000 , | 1.0000) | 6' | (1.1547 , | 1.1547) |
| 3' | (1.0000 , | −1.0000) | 7' | (1.1547 , | −1.1547) |
| 4' | (−1.0000 , | −1.0000) | 8' | (−1.1547 , | −1.1547) |
| 5' | (−1.0000 , | 1.0000) | 9' | (−1.1547 , | 1.1547) |
| 10' | (0 , | 2.0000) | 18' | (2.3094 , | 0) |
| 11' | (2.0000 , | 0) | 19' | (0 , | −2.3094) |
| 12' | (0 , | −2.0000) | 20' | (−2.3094 , | 0) |
| 13' | (−2.0000 , | 0) | 21' | (0 , | 2.3094) |
| 14' | (−2.0000 , | 2.0000) | 22' | (2.3094 , | 2.3094) |
| 15' | (2.0000 , | 2.0000) | 23' | (2.3094 , | −2.3094) |
| 16' | (2.0000 , | −2.0000) | 24' | (−2.3094 , | −2.3094) |
| 17' | (−2.0000 , | −2.0000) | 25' | (−2.3094 , | 2.3094) |
| | | | 26' | (0 , | 1.1547) |
| | | | 27' | (1.1547 , | 0) |
| | | | 28' | (0 , | −1.1547) |
| | | | 29' | (−1.1547 , | 0) |

TABLE IIIA

GROUP R — TEMPLATE POSITIONS - HOLE NUMBERS/SPHERE SIZE

| SYSTEM | TEMPLATE | LAYER | I | II | III | IV | 2' | 3' | 4' | 5' | 1' | 10' | 11' | 12' | 13' | 14' | 15' | 16' | 17' |
|---|---|---|---|---|---|---|---|---|---|---|---|---|---|---|---|---|---|---|---|
| 1" | A | 1 | | | | | a | a | a | a | | | | | | | | | |
|  |  | 2 | | | | | a | a | a | a | | | | | | | | | |
| 3" | C | 1 | | | | | | | | | a | a | a | a | a | | | | |
|  |  | 2 | | | | | a | a | a | a | | | | | | | | | |
|  |  | 3 | | | | | | | | | a | a | a | a | a | | | | |
| 4" | C | 1 | | | | | a | a | a | a | | | | | | | | | |
|  |  | 2 | | | | | | | | | a | a | a | a | a | | | | |
|  |  | 3 | | | | | a | a | a | a | | | | | | | | | |
| 5" | D | 1 | | | | | a | a | a | a | | | | | | | | | |
|  |  | 2 | | | | | | | | | b | | | | | | | | |
|  |  | 3 | | | | | a | a | a | a | | | | | | | | | |
| 6" | D | 1 | | | | | b | b | b | b | | | | | | | | | |
|  |  | 2 | | | | | | | | | a | | | | | | | | |
|  |  | 3 | | | | | b | b | b | b | | | | | | | | | |
| 7" | D | 1 | | | | | | | | | a | | | | | | | | |
|  |  | 2 | | | | | a | a | a | a | | | | | | | | | |
|  |  |   | | | | | | | | | c | | | | | | | | |
|  |  | 3 | | | | | | | | | a | | | | | | | | |
| 8" | D | 1 | | | | | f | f | f | f | | | | | | | | | |
|  |  | 2 | | | | | c | c | c | c | a | | | | | | | | |
|  |  | 3 | | | | | | | | | c | | | | | | | | |
|  |  |   | | | | | | | | | a | | | | | | | | |
| 9" | E | 1 | | | | | | | | | a | | | | a | | | | |
|  |  | 2 | | | d | | | | | | | | | | | | | | |
|  |  | 3 | | | | | | | a | a | | | | | | | | | |
| 10" | D | 1 | | | | | a | | a | | | | | | | | | | |
|  |  | 2 | | | | | | | | | b | | | | | | | | |
|  |  | 3 | | | | | | a | | a | | | | | | | | | |
| 11" | D | 1 | | | | | | b | | b | | | | | | | | | |
|  |  | 2 | | | | | | | | | a | | | | | | | | |
|  |  | 3 | | | | | b | | b | | | | | | | | | | |
| 14" | D | 1 | | | | | a | a | a | a | | | | | | | | | |
|  |  | 2 | | | | | | | | | b | | | | | | | | |
|  |  | 3 | | | | | a | a | a | a | | | | | | | | | |
| 15" | D | 1 | | | | | b | b | b | b | | | | | | | | | |
|  |  | 2 | | | | | | | | | a | | | | | | | | |
|  |  | 3 | | | | | b | b | b | b | | | | | | | | | |
| 16" | F | 1 | | | | | | | | | b | | | | | b | b | b | b |
|  |  | 2 | | | | | a | a | a | a | | | | | | | | | |
|  |  | 3 | | | | | | | | | | b | b | b | b | | | | |
|  |  | 4 | | | | | a | a | a | a | | | | | | | | | |
|  |  | 5 | | | | | | | | | b | | | | | b | b | b | b |
| 17" | C | 1 | | | | | | | | | a | a | a | a | a | | | | |
|  |  | 2 | | d | | d | | | | | | | | | | | | | |
|  |  | 3 | | | | | a | a | a | a | | | | | | | | | |
|  |  | 4 | | | d | | d | | | | | | | | | | | | |
|  |  | 5 | | | | | | | | | a | a | a | a | a | | | | |
| 18" | C | 1 | | | | | | | | | a | a | a | a | a | | | | |
|  |  | 2 | | d | d | d | d | | | | | | | | | | | | |
|  |  | 3 | | | | | a | a | a | a | | | | | | | | | |
|  |  | 4 | | d | d | d | d | | | | | | | | | | | | |
|  |  | 5 | | | | | | | | | a | a | a | a | a | | | | |
| 19" | C |   | | | | | e | e | e | e | | | | | | | | | |
|  |  | 1 | | | | | c | c | c | c | a | a | a | a | a | | | | |
|  |  | 2 | | | | | a | a | a | a | c | c | c | c | c | | | | |
|  |  | 3 | | | | | c | c | c | c | a | a | a | a | a | | | | |
|  |  |   | | | | | | | | | e | e | e | e | e | | | | |
| 20" | C |   | | | | | | | | | | | | | | | | | |
|  |  | 1 | | | | | a | a | a | a | c | c | c | c | c | | | | |
|  |  | 2 | | | | | c | c | c | c | a | a | a | a | a | | | | |
|  |  | 3 | | | | | a | a | a | a | c | c | c | c | c | | | | |
| 21" | C |   | | | | | e | e | e | e | | | | | | | | | |
|  |  | 1 | | | | | c | c | c | c | a | a | a | a | a | | | | |
|  |  | 2 | | d | d | d | d | | | | | | | | | | | | |

TABLE IIIA-continued

GROUP R
TEMPLATE POSITIONS - HOLE NUMBERS/SPHERE SIZE

| SYSTEM | TEMPLATE | LAYER | I | II | III | IV | 2' | 3' | 4' | 5' | 1' | 10' | 11' | 12' | 13' | 14' | 15' | 16' | 17' |
|---|---|---|---|---|---|---|---|---|---|---|---|---|---|---|---|---|---|---|---|
|  |  | 3 |  |  |  |  | a | a | a | a |  |  |  |  |  |  |  |  |  |
|  |  | 4 | d | d | d | d |  |  |  |  |  |  |  |  |  |  |  |  |  |
| 22" | C | 5 |  |  |  |  | c | c | c | c | a e | a e | a e | a e | a e |  |  |  |  |
|  |  | 1 |  |  |  |  | a | a | a | a | c | c | c | c | c |  |  |  |  |
|  |  | 2 | d | d | d | d |  |  |  |  |  |  |  |  |  |  |  |  |  |
|  |  | 3 |  |  |  |  | c | c | c | c | a | a | a | a | a |  |  |  |  |
|  |  | 4 | d | d | d | d |  |  |  |  |  |  |  |  |  |  |  |  |  |
| 23" | C | 5 |  |  |  |  | a | a | a | a | c | c | c e | c | c e |  |  |  |  |
|  |  | 1 |  |  |  |  | a | a | a | a |  |  | c | c | c |  |  |  |  |
|  |  | 2 |  |  |  |  |  |  | c | c | a | a | a | a | a |  |  |  |  |
|  |  | 3 |  |  |  |  | a | a | a | a | c | c |  | c |  |  |  |  |  |
| 24" | F | 1 |  |  |  |  |  |  |  |  | a |  |  |  |  | a | a | a | a |
|  |  | 2 |  |  |  |  | b | b | b | b |  |  |  |  |  |  |  |  |  |
|  |  | 3 |  |  |  |  |  |  |  |  |  | a | a | a | a |  |  |  |  |
|  |  | 4 |  |  |  |  | b | b | b | b |  |  |  |  |  |  |  |  |  |
|  |  | 5 |  |  |  |  |  |  |  |  | a |  |  |  |  | a | a | a | a |
| 25" | F | 1 |  |  |  |  |  |  |  |  | a |  |  |  |  | a g | a | a g | a |
|  |  | 2 |  |  |  |  |  | b |  | b |  |  |  |  |  |  |  |  |  |
|  |  | 3 |  |  |  |  |  |  |  |  |  | a | a | a | a |  |  |  |  |
|  |  | 4 |  |  |  |  | b |  | b |  |  |  |  |  |  |  |  |  |  |
|  |  | 5 |  |  |  |  |  |  |  |  | a |  |  |  |  | a | a | a | a |
| 26" | C | 1 |  |  |  |  | a | a | a | a |  |  |  |  |  |  |  |  |  |
|  |  | 2 | d |  | d |  |  |  |  |  |  |  |  |  |  |  |  |  |  |
|  |  | 3 |  |  |  |  |  |  |  |  | a | a | a | a | a |  |  |  |  |
|  |  | 4 |  | d |  | d |  |  |  |  |  |  |  |  |  |  |  |  |  |
|  |  | 5 |  |  |  |  | a | a | a | a |  |  |  |  |  |  |  |  |  |
| 27" | C | 1 |  |  |  |  | a | a | a | a |  |  |  |  |  |  |  |  |  |
|  |  | 2 | d | d | d | d |  |  |  |  |  |  |  |  |  |  |  |  |  |
|  |  | 3 |  |  |  |  |  |  |  |  | a | a | a | a | a |  |  |  |  |
|  |  | 4 | d | d | d | d |  |  |  |  |  |  |  |  |  |  |  |  |  |
|  |  | 5 |  |  |  |  | a | a | a | a |  |  |  |  |  |  |  |  |  |

TABLE IIIB

GROUP S
TEMPLATE POSITIONS - HOLE NUMBERS/SPHERE SIZE

| SYSTEM | TEMPLATE | LAYER | 1' | 6' | 7' | 8' | 9' | 18' | 19' | 20' | 21' | 22' | 23' | 24' | 25' | 26' | 27' | 28' | 29' |
|---|---|---|---|---|---|---|---|---|---|---|---|---|---|---|---|---|---|---|---|
| 2" | B | 1 |  | a | a | a | a |  |  |  |  |  |  |  |  |  |  |  |  |
|  |  | 2 | a |  |  |  |  |  |  |  |  |  |  |  |  |  |  |  |  |
|  |  | 3 |  | a | a | a | a |  |  |  |  |  |  |  |  |  |  |  |  |
| 12" | B | 1 |  |  | a |  | a |  |  |  |  |  |  |  |  |  |  |  |  |
|  |  | 2 | a |  |  |  |  |  |  |  |  |  |  |  |  |  |  |  |  |
|  |  | 3 |  | a |  | a |  |  |  |  |  |  |  |  |  |  |  |  |  |
| 13" | G | 1 | a |  |  |  |  |  |  |  |  | a h | a | a h | a |  |  |  |  |
|  |  | 2 |  | a |  | a |  |  |  |  |  |  |  |  |  |  |  |  |  |
|  |  | 3 |  |  |  |  |  | a | a | a | a |  |  |  |  |  |  |  |  |
|  |  | 4 |  |  | a |  | a |  |  |  |  |  |  |  |  |  |  |  |  |
|  |  | 5 | a |  |  |  |  |  |  |  |  | a | a | a | a |  |  |  |  |
| 28" | H | 1 | a |  |  |  |  | a | a | a | a |  |  |  |  |  |  |  |  |
|  |  | 2 |  |  |  |  |  |  |  |  |  |  |  |  |  | c | c | c | c |
|  |  | 3 |  | a | a | a | a |  |  |  |  |  |  |  |  |  |  |  |  |
|  |  | 4 |  |  |  |  |  |  |  |  |  |  |  |  |  | c | c | c | c |
|  |  | 5 | a |  |  |  |  | a | a | a | a |  |  |  |  |  |  |  |  |

TABLE IV

CRYSTAL SYSTEM NUMBERS IN TABLES IIIA and IIIB

1" Simple Cubic lattice type, Unit Cell
2" Body Centered Cubic lattice type, Unit Cell
3" Face Centered Cubic lattice type, Unit Cell
4" Coordination Number 12 or Cubic Closest Packing
5" Coordination Number 8 (ideal radius ratio)
6" Coordination Number 8, alternate method
7" Coordination Number 6 (ideal radius ratio)
8" Coordination Number 6, alternate method
9" Coordination Number 4 (ideal radius ratio)
10" Coordination Number 4, alternate method
11" Coordination Number 4, second alternate method
12" Coordination Number 4, third alternate method
13" Diamond Network Structure, Unit Cell
14 41 Cesium Chloride Structure, Unit Cell
15" Cesium Chloride Structure, Unit Cell, alternate method
16" Fluorite Structure, Unit Cell
17" Zinc Blende Structure, Unit Cell
18" Anti-fluorite Structure, Unit Cell
19" Rock Salt (Sodium Chloride) Structure, Unit Cell
20" Rock Salt Structure, Unit Cell, alternate method
21" Spinel "Type" of Structure
22" Spinel "Type" of Structure, alternate method
23" Cadmium Chloride "Type" of layer Structure
24" Anti-fluorite, alternate method, Unit Cell
25" Zinc Blende, alternate method, Unit Cell
26" Anti-fluorite, alternate method (second), Unit Cell
27" Zinc Blende, second alternate method, Unit Cell
28" Anti-fluorite, alternate method

TABLE IV-continued

CRYSTAL SYSTEM NUMBERS IN TABLES IIIA and IIIB
(third), Unit Cell

I claim:

1. A kit for demonstrating crystal structure models comprising,
    a planar base defining a first number of fixed location holes therein, said fixed location holes at locations corresponding to superposed sphere center projections of tangent spheres of different sizes from all models to be demonstrated,
    a multiplicity of templates, each template adapted for detachable joinder to said base and each template defining a unique hole pattern therein exposing a second number of holes in said base lesser than said first number when a template is detachably joined to said base, said hole locations in each template corresponding to sphere centers of tangent spheres of different sizes projected onto a plane parallel to the plane of said base wherein said sphere centers represent positions in a crystal structure,
    a plurality of rods, each having a proximal end disposed in one of said exposed holes of said base, and a distal end projecting away from said base, and
    a multiplicity of spheres, having at least first and second sizes having axial holes therethrough of a hole diameter slightly larger than the diameter of said rods mounted in movable relationship to said rods with each sphere size specifically correlated with exposed base holes to be tangent to at least one neighboring sphere.

2. The apparatus of claim 1 wherein said holes of said first number are spaced at intervals on the plane of said base, said intervals corresponding to X,Y coordinates of projections of sphere centers onto the plane of the base.

3. The apparatus of claim 1 wherein said base includes template alignment means for aligning said template with respect to said first number of holes.

4. The apparatus of claim 1 wherein adjacent spheres have different radii and are tangent along a plane parallel to the plane of the base.

5. The apparatus of claim 1 wherein adjacent spheres have different radii and are tangent along a plane perpendicular to the plane of the base.

6. The apparatus of claim 1 wherein adjacent spheres have different radii and are tangent along a line having an oblique angle with respect to the plane of the base 7. A kit for demonstrating crystal structure models by means of spheres comprising,
    a planar base defining a first number of fixed location holes therein, said fixed locations corresponding to superposed sphere center projections of tangent spheres of different sizes from all models to be demonstrated,
    a multiplicity of templates, each template defining a second number of holes therein, less than said first number, said holes corresponding to projected sphere centers of tangent spheres of different sizes for one crystal model to be demonstrated, each template adapted to be detachably joined to said base, one at a time, thereby successively exposing a hole pattern characteristic of one crystal model at a time,
    a multiplicity of rods, each having a proximal end disposed in one of said exposed holes of said base, and a distal end projecting away from said base, and
    a multiplicity of spheres of first and second sizes adapted for mounting on said rods with sphere centers over said holes in positions representing crystal models whose sphere centers are projected on said templates.

* * * * *